L. R. GRUSS.
PNEUMATIC SPRING FOR VEHICLES.
APPLICATION FILED AUG. 24, 1910.

1,013,487.

Patented Jan. 2, 1912.

Witnesses
F. E. Maynard,
Charles Pickles

Inventor;
Lucian R. Gruss;
By G. H. Strong.
his Atty ver
UNITED STATES PATENT OFFICE.

LUCIEN R. GRUSS, OF CHICO, CALIFORNIA, ASSIGNOR TO THE PNEUMATIC CUSHION COMPANY, INC., OF PHOENIX, ARIZONA TERRITORY, A CORPORATION OF ARIZONA TERRITORY.

PNEUMATIC SPRING FOR VEHICLES.

1,013,487. Specification of Letters Patent. Patented Jan. 2, 1912.

Application filed August 24, 1910. Serial No. 578,741.

*To all whom it may concern:*

Be it known that I, LUCIEN R. GRUSS, citizen of the United States, residing at Chico, in the county of Butte and State of California, have invented new and useful Improvements in Pneumatic Springs for Vehicles, of which the following is a specification.

This invention pertains to pneumatic cushioning means for vehicles.

The object of my invention is to provide a pneumatic cushion for the bodies of automobiles and other vehicles; to provide means whereby the vehicle body is supported on a pneumatic cushion; means whereby the pressure of the pneumatic cushion is created, and means for automatically replenishing the charge of fluid.

The invention consists of the parts and the construction and combination of parts as hereinafter more fully described and claimed, having reference to the accompanying drawings, in which—

Figure 1:
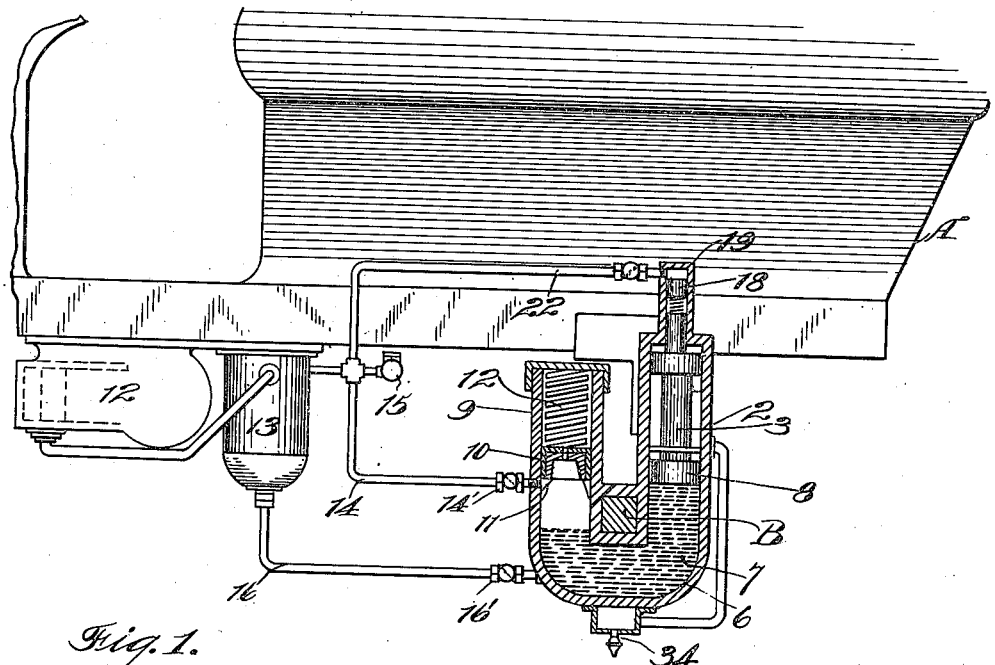
Figure 2:
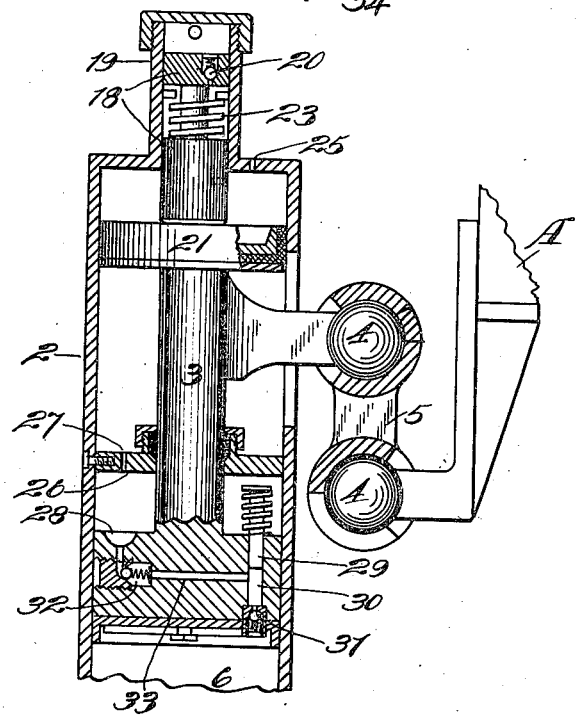

Figure 1 is a side elevation of a portion of a vehicle showing the device. Fig. 2 is an enlarged sectional detail of a cylinder.

In the present embodiment of my invention, I have shown interposed between the body A and the axle B of the vehicle suitable cylinders 2, within which are slidable pistons 3 connected by universal joints 4 and links 5 to the vehicle body A.

The cylinders 2, one or more of which may be mounted upon the ends of the axle, may be of any suitable or desired form, and may be connected in appropriate manner to the axles, as the exigencies require. In the present instance, the cylinder is formed of a substantially U-shaped casting, and within which, in the chamber 6, is a quantity of fluid 7, which may be oil or other substance, and upon which the lower head 8 of the piston is adapted to rest. In the other member 9 of the cylinder casing is mounted a cup-shaped leather, or other suitable piston 10, which is normally pressed down upon supporting lugs 11, by a powerful spring 12.

In practice, a sufficient volume of oil will be placed in the lower chamber 6, and when the load of the body of the vehicle is transmitted to the piston 3, and thence upon the surface of the oil 7, the latter will rise in the arm 9, and compress a pre-determined volume of air below the piston 10. Under extreme conditions, as when the vehicle is suddenly excessively jolted and consequently imposes greater pressure on the flexible oil piston 7, which would then compress the air below the piston 10 to a greater degree than the same is designed normally to carry, this sudden greater compression of air would, if provision were not made to relieve the excessive pressure, result in not sufficiently cushioning the motions of the body of the vehicle. In other words, the resiliency would not be flexible enough and the vibrations of the body of the car would not be easily and gradually checked. In order then to prevent this disadvantage of the excessive pressure of air in the cushion when extreme loads are imposed, the piston 10 is provided, and after the pressure of air in the chamber 9 reaches a point equal to the downward pressure of the spring 12, and then exceeds that downward pressure the piston 10 will gradually lift, compressing air at the same time in the chamber in which the spring 12 is mounted. The advantage of this auxiliary cushion, formed by the spring 12 and the air contained in the chamber in which it is mounted, is that the oil, under the impulse of piston head 8, against the air in the chamber 9, is not suddenly impeded, and when the pressure in chamber 9 has reached such a point as would ordinarily be further non-compressible or too stiff to form a reasonably resilient check to the vibrations of the car body, then the piston 10 will yield to assist in the checking of the descent of the piston head 8. Manifestly, then, the moment that the vibrations are checked by the cushioning chambers, and the recoil commences the spring 12 will again depress the piston 10 and the expansible air in the cylinder 9 will force back the fluid piston 7 and lift the piston head 8. The piston 10 thus constitutes, in fact, a yielding head for that end of the cylinder, between which head and the body of oil 7, is formed an air chamber which is charged with air under pressure in the following manner: In order to primarily charge the several air cylinders 9, there is provided on the body of the vehicle A a suitable compressor 12 driven by suitable connections with the engine and from the compressor 12 air is delivered into a tank 13 from which connections 14 are made to the several cylinders 9. In order to prevent an excess of pressure accumulating in the reservoir 13, an automatic safety valve 15 is mounted therein, and this will open when a predetermined pressure has accumulated in the reservoir. From the lower portion of the tank 13 are extended a plurality of pipes 16 adapted to contain oil, and which connect with the lowermost portions of the U-shaped casting of the cushion. By this means the constant supply of air is maintained in each of the chambers 9 at uniform pressure, and the oil-forming movable pistons 7 reacting against the superposed air cushion is prevented from moving toward the reservoir by means of suitable check valves 16' mounted in the pipes 16 at the point where they connect to the several cylinders. In a similar manner, the air as it is compressed in each of the air chambers 9 is prevented from returning through the connections 14 to the reservoir by means of check valves 14' located in the connections 14 and adjacent the cylinders 9.

In order to constantly keep the pressure under uniform degree in the system, I mount a small plunger 18 in the head 19 of each cylinder 2, and which plunger is provided with a small valve 20 which will close when the plunger is pushed up by contact with the upper end 21 of the piston 3, a quantity of air being compressed and discharged, through a pipe 22, into the air system. Thus, after the system is once charged by the compressor 12, the pressure will be kept up by the reciprocation of the plunger 18. This is an important feature in that there would inevitably occur a small leakage of the air, and at each reciprocation of the main piston 3 and its abutment against the compression piston 18, a volume of air of such quantity as may be required would be compressed at each movement of the piston 18. Should the number of reciprocations of the piston 18 result in an accumulation of more than the desired pressure in the system, then the automatic safety valve 15 would open and allow the excess to escape. The conductors, 22, which carry the fluid compressed by the pistons, 18, are so connected to the pipe, 14, that the several check-valves, 14', are interposed between the conductors, 22, and the cylinders, 9; thus when an excessive pressure has been accumulated by the automatic compressors, 18, the safety valve, 15, will open and prevent any increase of pressure in the several cylinders, 9.

A spring 23 mounted within the compression chamber 19 will normally depress the plunger 18 as the piston 3 descends. A fresh volume of air will pass upwardly through the valve 20 and prevent the formation of a vacuum at that point. The piston 18 is reduced in diameter at one part to receive the spring 23 which re-acts against shoulders in the cylinder 19 and upon the piston to hold the latter down upon the piston flange 21, so that when the piston 3 moves up it lifts piston 18 which will be forced down by spring 23 when the piston 3 descends.

For the purpose of preventing a too sudden recoil of the piston 3 in its cylinder 2, the piston is formed with an enlarged head $2^1$, and this will, when ascending, compress a volume of air between its upper surface, and the top of the cylinder 2 gradually checking the recoil of the piston 3. A small port 25 is provided in the top of the cylinder to admit air to pass inwardly and outwardly in small quantities to prevent the formation of vacuum in the operation of the piston, and also to supply air to the upper part of the cylinder 19.

Since one side of the cylinder 2 has a sufficiently large aperture to receive the link connection 5 from the body of the car, it is desirable to exclude, as far as possible, the entrance of dust to the interior of the casing, and for this purpose I have introduced a diaphragm 26 to catch such particles of dust as may enter, this diaphragm being perforated at 27 to allow a small quantity of air to pass back and forth.

Since it is practically impossible to attain perfection in workmanship and absolutely prevent the escape of oil from the chamber 6 to the upper surface of the piston head 8, I have found it expedient to form a slight concave groove 28 around the upper surface of the piston head for the catching of such oil as will get past the piston 8, and in order to avoid, as far as possible, personal inspection at frequent intervals of the several resilient cushions by the machine-driver, it is desirable to automatically return the escaped oil back to the cylinder 6. To accomplish this, I have mounted a small plunger 29 in the piston 8, which, when raised sufficiently to abut the diaphragm 26, will then eject a volume of oil from the duct 30, past a check valve 31 and into the chamber 6.

The oil in the chamber 30 is prevented from passing upwardly and into the groove 28 by means of a small check valve 32 suitably mounted in a canal 33 which conveys the oil from the groove 28 downwardly to the chamber 30. It will then be seen that at each reciprocation of the piston 8 the plunger 29 will be carried against the diaphragm 26 and will be relatively depressed into the piston 8, thus ejecting, as before stated, a quantity of the fluid back into the chamber 7. This feature of the invention obviously avoids any personal attention being devoted to the spring system, as also does the feature of automatically sustaining the desired pressure in the air chambers, by means of the auxiliary compressors 18.

In operation, it is first necessary, after the cylinders have been charged with a sufficient volume of oil, to compress by means of the compressor 12, a sufficient volume of air in the container 13 to the desired pressure, this pressure, of course, being determined by the weight of the load of the vehicle to be supported, and then after the reservoir 13 has been charged it is no longer necessary to run the compressor, as all of the system will be equally charged with fluid pressure. When the vehicle is running the possible leakage of air is remedied by the automatic operation and charging of the auxiliary compressors 18, of which there is one for each of the cushions, and at each reciprocation of the plunger 18 a small volume of air will be added to the system, thus keeping the pressure up to the normal degree, excess being relieved as necessary by the valve 15. The machine is also automatic in the replacement of the leak oil at the several cylinders 8, when the car is in operation, and when the car is not running oil which may possibly escape may be caught in a suitable trap 34, one of which is suitably mounted in such position to catch the excess leak oil from within the cylinders.

Having thus described my invention, what I claim and desire to secure by Letters Patent is—

1. The combination in a vehicle, of the body and an axle thereof, an air cylinder supported on one of said parts and a piston connected to the other of said parts and working in the cylinder, an air compressor on the vehicle connected with the cylinder to maintain an air pressure therein and provide an air cushion for the piston, and means whereby the air pressure within the air cushion is automatically recharged during the running of the vehicle, said means including auxiliary air compressors within the cylinder operable by the piston independently of the engine.

2. The combination in a vehicle, of the body and an axle thereof, an air cylinder supported on one of said parts and a piston connected to the other of said parts and working in the cylinder, an air compressor on the vehicle connected with the cylinder to maintain an air pressure therein and provide an air cushion for the piston, and means whereby the air pressure within the air cushion is automatically recharged during the running of the vehicle, said means including air compressing plungers mounted in the cylinder and actuated by the reciprocation of the piston.

3. The combination in a vehicle, of the body and an axle thereof, an air cylinder supported on one of said parts and a piston connected to the other of said parts and working in the cylinder, an air compressor on the vehicle connected with the cylinder to maintain an air pressure therein and provide an air cushion for the piston, and an air reservoir and connections between said reservoir and the cylinder whereby an even pressure is maintained, and means for automatically recharging the air pressure as the latter is reduced by leakage, said means including compressing plungers in the cylinder and actuated by the piston.

4. The combination in a vehicle, of the body and an axle thereof, an air cylinder supported on one of said parts and a piston connected to the other of said parts and working in the cylinder, an air compressor on the vehicle connected with the cylinder to maintain an air pressure therein and provide an air cushion for the piston, an air reservoir and connections between said reservoir and the cylinder whereby an even pressure is maintained, means for automatically recharging the air pressure as the latter is reduced by leakage, said means including compressing plungers in the cylinder and actuated by the piston, and a safety valve connected to said pressure reservoir and adapted to automatically relieve any excess of pressure.

5. The combination in a vehicle, of the body and an axle thereof, an air cylinder supported in one of said parts and a piston connected to the other of said parts and working in the cylinder, an air compressor on the vehicle connected with the cylinder to maintain an air pressure therein and provide an air cushion for the piston, an air reservoir and connections between said reservoir and the cylinder whereby an even pressure is maintained, means for automatically recharging the air pressure as the latter is reduced by leakage, said means including compressing plungers in the cylinder and actuated by the piston, a safety valve connected to said pressure reservoir and adapted to automatically relieve any excess of pressure, and an auxiliary pneumatic cushion adapted to come into operation after a pre-determined pressure has been reached in the pneumatic cushion.

6. The combination in a vehicle of the body and an axle thereof, an air cylinder supported on one of said parts and a piston connected to the other of said parts and working in the cylinder, an air compressor on the vehicle connected with the cylinder to maintain an air pressure therein and provide an air cushion for the piston, an air reservoir and connections between said reservoir and the cylinder whereby an even pressure is maintained, means for automatically recharging the air pressure as the latter is reduced by leakage, said means including compressing plungers in the cylinder and actuated by the piston, a safety valve connected to said pressure reservoir and adapted to automatically relieve any excess of pressure, and an auxiliary pneumatic cushion adapted to come into operation after a pre-determined pressure has been reached in the pneumatic cushion, said auxiliary cushion including an air compressing plunger and adapted to yield when said pre-determined pressure has been attained.

7. The combination in a vehicle of the body and an axle thereof, an air cylinder supported on one of said parts and a piston connected to the other of said parts and working in the cylinder, an air compressor on the vehicle connected with the cylinder to maintain an air pressure therein and provide an air cushion for the piston, an air reservoir and connections between said reservoir and the cylinder whereby an even pressure is maintained, means for automatically recharging the air pressure as the latter is reduced by leakage, said means including compressing plungers in the cylinder and actuated by the piston, a safety valve connected to said pressure reservoir and adapted to automatically relieve any excess of pressure, an auxiliary pneumatic cushion adapted to come into operation after a predetermined pressure has been reached in the pneumatic cushion, said means including an air compressing plunger and adapted to yield when said pre-determined pressure has been attained, and a resilient member reactive against said piston.

8. The combination in a vehicle of a body and an axle thereof, a substantially U-shaped air cylinder supported on one of said parts, a piston in said cylinder connected to the other of said parts, said cylinder containing a fluid in the lower portion between the two parts of the cylinder and upon which fluid the piston is effective, a chamber in the cylinder containing air above the fluid, means for creating an initial pressure in the air chamber, means whereby said pressure is automatically sustained during the operation of the vehicle, and an auxiliary resilient cushion and means whereby the volume of fluid in the cylinder is maintained.

9. The combination with a vehicle, of a fluid compresser, an axle, a cylinder connected to the axle, a piston operable in said cylinder and connected to the vehicle body, said cylinder having a reservoir containing fluid and liquid, conducting connections between the reservoir and the cylinder, an automatic releasing valve adapted to open after a predetermined pressure has accumulated within the reservoir, and means mounted in the cylinder and adapted to be actuated by the reciprocation of the piston to automatically sustain the predetermined pressure within the reservoir.

10. The combination with a vehicle and its axle of an air reservoir, a cylinder, a piston operable within said cylinder a fluid below said piston in the cylinder, connections between the cylinder and the reservoir whereby the reciprocation of the piston will compress the air within the reservoir, means operable in conjunction with the piston whereby a pre-determined pressure of air in the reservoir may be automatically sustained, and means operable in conjunction with the piston whereby the original volume of oil is automatically maintained by the replacement of leakage.

11. The combination in a vehicle, of the body and an axle thereof, an air cylinder supported on one of said parts and a piston connected to the other of said parts and working in the cylinder, an air compressor on the vehicle connected with the cylinder to maintain an air pressure therein and provide an air cushion for the piston, said cylinder having a valved fluid connection between opposite sides of the piston, and said piston having a part adapted to compress air at one end of the cylinder and deliver it to the other through said fluid connection for the purpose of automatically recharging the air pressure in the cylinder during the running of the vehicle.

12. The combination in a vehicle, of a body, and an axle thereof, an air cylinder having a piston, a fluid connection between opposite ends of the cylinder, means for supplying compressed air to the cylinder beneath the piston to provide an air cushion therefor, and an air compressing device in said cylinder and operable by the automatic movement of the piston to maintain normal pressure in the cylinder.

13. In a pneumatic cushioning device, the combination of two parts to be cushioned and movable toward and from each other, a cylinder mounted on one part, a piston in the cylinder and connected to and supporting the other part, an independent source of air pressure supply connected with the cylinder and normally upholding the piston and load, and an air compressing device in said cylinder and operable by the automatic movement of the piston to maintain normal pressure in the cylinder.

14. In a pneumatic cushioning device, the combination of two parts to be cushioned and movable toward and from each other, a cylinder mounted on one part, a piston in the cylinder and having an offset universal joint connection with the other part, a body of liquid maintained beneath the piston and supporting the piston, said cylinder having a yielding head between which and said piston said liquid is contained, an air chamber between said yielding head and said body of liquid, and an air compressing device in said cylinder and operable by the automatic movement of the piston to maintain normal pressure in the cylinder.

15. In a pneumatic cushioning device, the combination of two parts to be cushioned and movable toward and from each other, a cylinder mounted on one part, a piston in the cylinder connected with the other part, a body of liquid maintained beneath the piston and supporting the piston, said cylinder having a yielding head between which and said piston said liquid is contained, an air chamber between said yielding head and said body of liquid, and an air compressing device in said cylinder and operable by the automatic movement of the piston to maintain normal pressure in the cylinder.

16. The combination in a vehicle, of a body and an axle therefor, a U-shaped air cylinder supported on one of said parts, a piston in one leg of said cylinder connected to the other of said parts, a body of liquid within the cylinder upon which the piston is effective, the other leg of the cylinder containing a yieldable head, an air chamber between said head and the body of liquid, and an air compressing device in said cylinder and operable by the automatic movement of the piston to maintain normal pressure in the cylinder.

17. The combination in a vehicle, of a body and an axle therefor, a U-shaped air cylinder supported on one of said parts, a piston in one leg of said cylinder connected to the other of said parts, a body of liquid within the cylinder upon which the piston is effective, the other leg of the cylinder containing a yieldable head, an air chamber between said head and the body of liquid, means for delivering air under pressure into said chamber to form a cushion support for said piston, and an air compressing device in said cylinder and operable by the automatic movement of the piston to maintain normal pressure in the cylinder.

In testimony whereof I have hereunto set my hand in the presence of two subscribing witnesses.

LUCIEN R. GRUSS.

Witnesses:
C. J. STILSON,
ELEANOR F. STILSON.